US011085941B2

(12) United States Patent
Asakura

(10) Patent No.: US 11,085,941 B2
(45) Date of Patent: Aug. 10, 2021

(54) AUTOMATED ANALYZER

(71) Applicant: JEOL Ltd., Tokyo (JP)

(72) Inventor: Makoto Asakura, Tokyo (JP)

(73) Assignee: JEOL Ltd., Tokyo (JP)

( * ) Notice: Subject to any disclaimer, the term of this patent is extended or adjusted under 35 U.S.C. 154(b) by 238 days.

(21) Appl. No.: 16/186,848

(22) Filed: Nov. 12, 2018

(65) Prior Publication Data

US 2019/0145993 A1 May 16, 2019

(30) Foreign Application Priority Data

Nov. 13, 2017 (JP) .............................. JP2017-218027

(51) Int. Cl.
    *G01N 35/02* (2006.01)
    *G01N 35/10* (2006.01)

(52) U.S. Cl.
    CPC ....... *G01N 35/025* (2013.01); *G01N 35/1004* (2013.01); *G01N 35/1065* (2013.01); *G01N 2035/1032* (2013.01)

(58) Field of Classification Search
    CPC ............. G01N 35/025; G01N 35/1004; G01N 35/1065; G01N 35/1032
    See application file for complete search history.

(56) References Cited

U.S. PATENT DOCUMENTS

| 4,871,682 A | * | 10/1989 | Mazza | ..................... G01N 1/38 436/179 |
| 5,184,634 A | * | 2/1993 | Kitajima | ................. B01L 13/02 134/95.1 |
| 6,752,960 B1 | * | 6/2004 | Matsubara | ......... G01N 35/1004 422/552 |
| 2012/0318302 A1 | * | 12/2012 | Nakayama | ................ B08B 3/08 134/26 |
| 2014/0363896 A1 | | 12/2014 | Suzuki et al. | |
| 2015/0355209 A1 | * | 12/2015 | Tomii | ............... G01N 35/00584 436/43 |
| 2018/0156702 A1 | | 6/2018 | Suzuki et al. | |
| 2020/0064364 A1 | * | 2/2020 | Ito | .......................... G01N 35/04 |

FOREIGN PATENT DOCUMENTS

JP 6067584 B2 1/2017

* cited by examiner

*Primary Examiner* — Jill A Warden
*Assistant Examiner* — John McGuirk
(74) *Attorney, Agent, or Firm* — The Webb Law Firm

(57) ABSTRACT

An automated analyzer includes: a special washing information storage unit that stores special washing information for avoiding carry-over of a pretreatment specimen dispensing nozzle; a first special washing liquid dispensing unit that dispenses a special washing liquid used for special washing to a pretreatment container; and a special washing control unit that controls the first special washing liquid dispensing unit, a pretreatment table, and the pretreatment specimen dispensing nozzle based on the special washing information and information on specimens consecutively dispensed by the pretreatment specimen dispensing nozzle for causing the first special washing liquid dispensing unit to dispense the special washing liquid to the pretreatment container and for causing the pretreatment specimen dispensing nozzle to suck the special washing liquid from the pretreatment container.

20 Claims, 7 Drawing Sheets

| CONDI-TION NO. | TYPE/EXAMINATION ITEM OF SPECIMEN MATERIAL HAVING INFLUENCE ON CARRY-OVER | | TYPE/EXAMINATION ITEM OF SPECIMEN MATERIAL INFLUENCED BY CARRY-OVER | WASHING LIQUID NO. | NUMBER OF WASHING TIMES |
|---|---|---|---|---|---|
| 1 | SERUM | ⇒ | URINE | 1 | 1 |
| 2 | | ⇒ | | | |
| 3 | | ⇒ | | | |

INTER-SPECIMEN CARRY-OVER AVOIDANCE SETTING SCREEN

FIG. 3

| ANALYZER OPERATION CYCLE (57) | SPECIMEN DISPENSING MECHANISM OPERATION (58) | DILUTING AND STIRRING MECHANISM OPERATION (59) | DILUTED SPECIMEN DISPENSING MECHANISM OPERATION (60) |
|---|---|---|---|
| (1) | DISPENSE SPECIMEN A | STIR SPECIMEN Z | DISPENSE SPECIMEN Y |
| (2) | SUCK ALKALINE WASHING AGENT FROM WASHING LIQUID SUPPLY UNIT AND DISPENSE TO DILUTION CONTAINER | STIR SPECIMEN A | DISPENSE SPECIMEN Z |
| (3) | DISPENSE SPECIMEN B | STIR ALKALINE WASHING AGENT | DISPENSE SPECIMEN A |
| (4) | DISPENSE SPECIMEN C | STIR SPECIMEN B | SUCK ALKALINE WASHING AGENT AND DISCARD TO DILUTED SPECIMEN DISPENSING NOZZLE WASHING MECHANISM |
| (5) | DISPENSE SPECIMEN D | STIR SPECIMEN C | DISPENSE SPECIMEN B |

FIG. 5A

| ANALYZER OPERATION CYCLE (57) | DILUTION CONTAINER NO. (N) | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| (1) | A | | w | w | w | a | w | | | | | | | | | | | | | | | | X | Y | Z |
| (2) | A | a | | w | w | w | a | w | | | | | | | | | | | | | | | X | Y | Z |
| (3) | A | a | B | | w | w | w | a | w | | | | | | | | | | | | | | X | Y | Z |
| (4) | A | a | B | C | | w | w | w | a | w | | | | | | | | | | | | | X | Y | Z |
| (5) | A | a | B | C | D | | w | w | w | a | w | | | | | | | | | | | | X | Y | Z |

FIG. 5B

| ANALYZER OPERATION CYCLE | SPECIMEN DISPENSING MECHANISM OPERATION | DILUTING AND STIRRING MECHANISM OPERATION | DILUTED SPECIMEN DISPENSING MECHANISM OPERATION |
|---|---|---|---|
| (5) | DISPENSE SPECIMEN D | STIR SPECIMEN C | DISPENSE SPECIMEN B |
| (6) | DISPENSE SPECIMEN E | STIR SPECIMEN D | SUCK ALKALINE WASHING AGENT AND DISCARD TO DILUTED SPECIMEN DISPENSING NOZZLE WASHING MECHANISM |
| (7) | DISPENSE SPECIMEN F | STIR SPECIMEN E | DISPENSE SPECIMEN X |

FIG. 6A

| ANALYZER OPERATION CYCLE | DILUTION CONTAINER NO. | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| (5) | A | a | B | C | D |   | w | w | w | a | w |   |   |   |   |   |   |   |   |   |   |   | X | Y | Z |
| (6) | A | a | B | C | D | E |   | w | w | w | a | w |   |   |   |   |   |   |   |   |   |   | X | Y | Z |
| (7) | A | a | B | C | D | E | F |   | w | w | w | a | w |   |   |   |   |   |   |   |   |   | X | Y | Z |

FIG. 6B

| ANALYZER OPERATION CYCLE | DILUTED SPECIMEN DISPENSING MECHANISM OPERATION | FIRST REAGENT DISPENSING MECHANISM OPERATION |
|---|---|---|
| (5) | DISPENSE SPECIMEN B | — |
| (6) | — | SUCK ACID WASHING AGENT AND DISCHARGE TO REACTION CONTAINER |
| (7) | SUCK ACID WASHING AGENT AND DISCARD TO DILUTED SPECIMEN DISPENSING NOZZLE WASHING MECHANISM | DISPENSE FIRST REAGENT FOR ANALYZING SPECIMEN X |
| (8) | DISPENSE SPECIMEN X | DISPENSE FIRST REAGENT FOR ANALYZING SPECIMEN C |

FIG. 7

AUTOMATED ANALYZER

Japanese Patent Application No. 2017-218027, filed on Nov. 13, 2017, is hereby incorporated by reference in its entirety.

BACKGROUND OF THE INVENTION

Field of the Invention

The present invention relates to an automated analyzer that analyzes components included in a specimen such as blood or urine.

Description of Related Art

In an automated analyzer, a specimen such as blood or urine stored in a specimen container is dispensed to a reaction container by a specimen dispensing mechanism, a reagent stored in a reagent container is dispensed to the reaction container by a reagent dispensing mechanism, the specimen and the reagent in the reaction container react with each other, and absorbance of the reaction liquid is measured, whereby a specific component (hereinafter referred to as an examination item) included in the specimen is analyzed.

The specimen dispensing mechanism includes a specimen dispensing nozzle and sucks the specimen into the specimen dispensing nozzle to dispense the specimen from the specimen container to the reaction container. After the specimen dispensing mechanism dispenses the specimen to the reaction container, the specimen remaining in the specimen dispensing nozzle contaminates a specimen to be dispensed subsequently and has an adverse effect on an analysis value of the specimen to be dispensed subsequently (hereinafter, this adverse effect is referred to carry-over). In order to avoid the carry-over, generally, after the specimen dispensing mechanism dispenses the specimen to the reaction container, the inner and outer walls of the specimen dispensing nozzle are washed with water (hereinafter, this operation is referred to as post-dispensing water washing).

However, in recent years, the number of types of analysis target specimen materials (serum, plasma, urine, and the like) and the number of types of examination items requiring high-sensitivity analysis have been increasing. Moreover, some of examination items may greatly differ in concentration depending on the type of specimen materials. When specimen materials in which the concentrations of examination items are greatly different are analyzed consecutively, or when examination items requiring high-sensitivity analysis are analyzed, it may be impossible to avoid carry-over between specimens via a specimen dispensing nozzle by the post-dispensing water washing.

Therefore, in a current automated analyzer, the carry-over via a specimen dispensing nozzle is avoided by performing washing with a special washing liquid such as an alkaline washing agent having higher washing power than water in addition to performing post-dispensing water washing on the specimen dispensing nozzle.

Japanese Patent No. 6,067,584 proposes an automated analyzer which includes a washing liquid vessel provided on a moving trajectory of a specimen dispensing nozzle to store a special washing liquid such as an alkaline washing agent, and in which, when a combination of specimen materials in which the specimen dispensing nozzle may cause carry-over are continuously dispensed, special washing is performed on the specimen dispensing nozzle using a special washing liquid in the washing liquid vessel when the specimen material is switched.

However, some automated analyzers include a specimen pretreatment mechanism that performs pretreatment such as dilution on a specimen before the specimen is dispensed to a reaction container. This specimen pretreatment mechanism generally includes a pretreatment container that stores a specimen and a pretreatment liquid dispensed by a specimen dispensing mechanism and a pretreatment specimen dispensing mechanism that dispenses a pretreated specimen (a pretreatment specimen) from the pretreatment container to a reaction container.

The pretreatment specimen prepared in the pretreatment container is sucked into the pretreatment specimen dispensing nozzle provided in the pretreatment specimen dispensing mechanism and is dispensed to the reaction container. Therefore, the specimen makes contact with at least the specimen dispensing nozzle and the pretreatment specimen dispensing nozzle until it is delivered from the specimen container to the reaction container.

Therefore, in the automated analyzer including such a specimen pretreatment mechanism, when carry-over between specimens via the specimen dispensing nozzle occurs, carry-over between specimen via the pretreatment specimen dispensing nozzle may also occur.

Therefore, in the automated analyzer including the specimen pretreatment mechanism, a washing liquid vessel for special washing similar to Japanese Patent No. 6,067,584 is also provided on a moving trajectory of the pretreatment specimen dispensing nozzle. When a combination of specimens in which the pretreatment specimen dispensing nozzle may cause carry-over are dispensed continuously, special washing is performed on the pretreatment specimen dispensing nozzle using a special washing liquid. In this way, it is possible to avoid carry-over between specimens via the pretreatment specimen dispensing nozzle.

However, when a washing liquid vessel for special washing is provided near the pretreatment specimen dispensing nozzle, the analyzer has a complex structure and the cost increases. Moreover, the amount of a washing liquid used for avoiding inter-specimen carry-over increases.

SUMMARY OF THE INVENTION

The invention provides an automated analyzer including a specimen pretreatment mechanism, capable of avoiding inter-specimen carry-over via a pretreatment specimen dispensing nozzle, preventing the analyzer from becoming complex, and reducing the amount of a washing liquid used for washing the pretreatment specimen dispensing nozzle.

According to an aspect of the invention, there is provided an automated analyzer including:

a specimen table that holds a plurality of specimen containers for storing specimens;

a pretreatment table that holds a plurality of pretreatment containers for storing pretreatment specimens obtained by performing pretreatment on the specimens;

a reaction table that holds a plurality of reaction containers for causing the pretreatment specimens to react with reagents;

a reagent table that holds a plurality of reagent containers for storing the reagents;

a specimen dispensing nozzle for delivering the specimens from the specimen containers held on the specimen table to the pretreatment containers held on the pretreatment table;

a pretreatment specimen dispensing nozzle for delivering the pretreatment specimens from the pretreatment containers held on the pretreatment table to the reaction containers held on the reaction table; and a reagent dispensing nozzle for delivering the reagents from the reagent table to the reaction containers, the automated analyzer performing pretreatment on the specimens in the pretreatment containers, causing the obtained pretreatment specimens to react with the reagents in the reaction containers, and analyzing components in the specimens, the automated analyzer comprising:

a special washing information storage unit that stores special washing information including conditions required for special washing for avoiding carry-over of the pretreatment specimen dispensing nozzle and a washing method for the special washing;

a first special washing liquid dispensing unit that dispenses a special washing liquid used for the special washing to the pretreatment containers;

a special washing determination unit that determines the necessity of the special washing based on the special washing information and information on the specimens consecutively dispensed by the pretreatment specimen dispensing nozzle, and issues a special washing command; and a special washing control unit that controls the first special washing liquid dispensing unit, the pretreatment table, and the pretreatment specimen dispensing nozzle based on the special washing command from the special washing determination unit for causing the first special washing liquid dispensing unit to dispense the special washing liquid to the pretreatment containers held on the pretreatment table, and for causing the pretreatment specimen dispensing nozzle to suck the special washing liquid from the pretreatment containers storing the special washing liquid.

BRIEF DESCRIPTION OF THE DRAWINGS

FIG. 3 illustrates an example of an inter-specimen carry-over avoidance setting screen according to an embodiment of the invention.

FIGS. 5A and 5B are diagrams for describing an operation of an automated analyzer for avoiding an inter-specimen carry-over via a diluted specimen dispensing nozzle according to a first embodiment of the invention.

FIGS. 6A and 6B are diagrams for describing an operation of an automated analyzer for avoiding an inter-specimen carry-over via a diluted specimen dispensing nozzle according to a second embodiment of the invention.

FIG. 7 is a diagram for describing an operation of an automated analyzer for avoiding inter-specimen carry-over via a diluted specimen dispensing nozzle when a dilution container storing a special washing liquid is not present on a dilution turntable according to the second embodiment of the invention.

DESCRIPTION OF THE INVENTION

Figure 1:
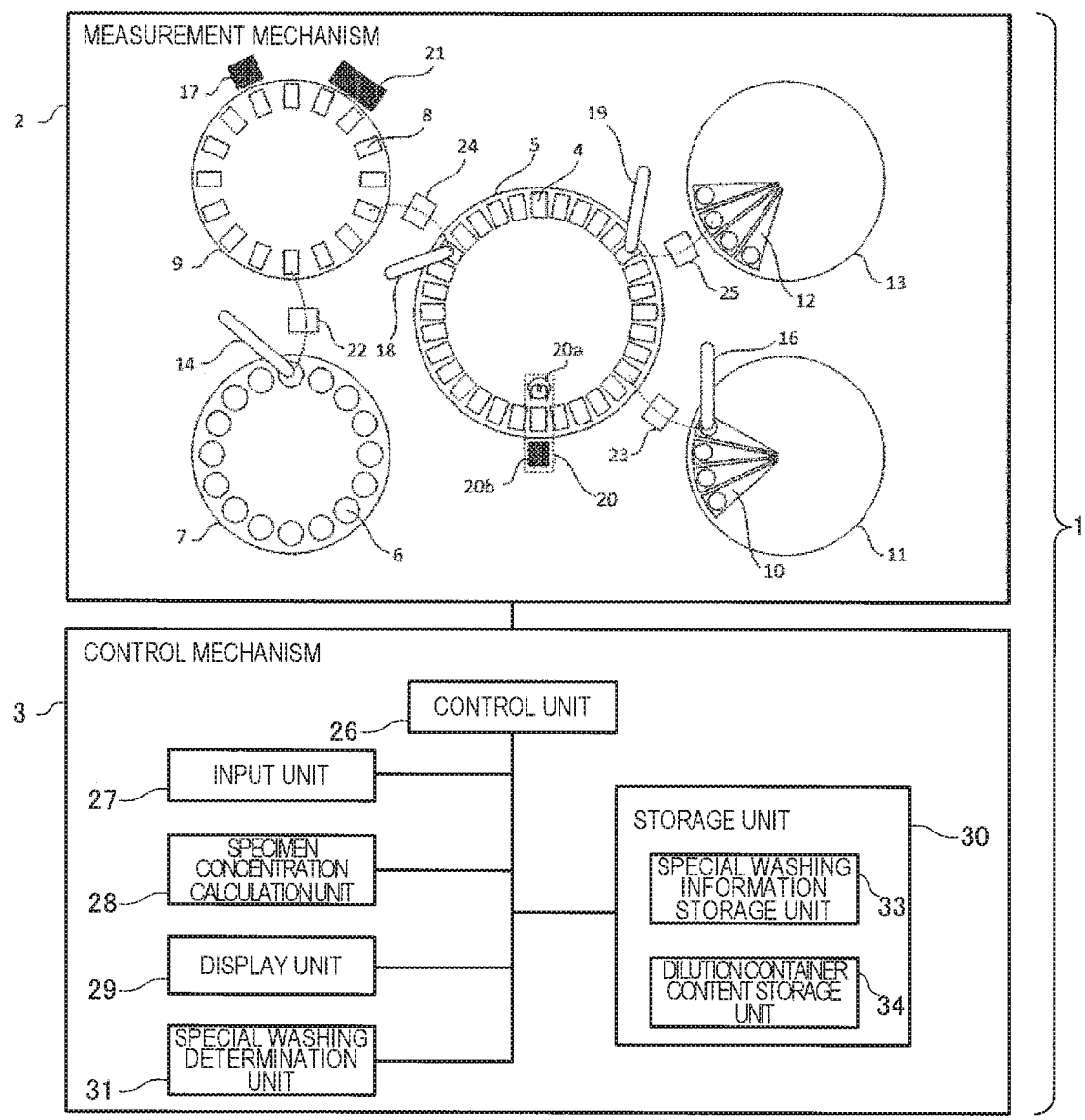
FIG. 1 is a schematic configuration diagram of an automated analyzer according to an embodiment of the invention.

In order to solve the problems and attain the object of the invention, an automated analyzer according to an embodiment of the invention is an automated analyzer including: a specimen table that holds a plurality of specimen containers for storing specimens; a pretreatment table that holds a plurality of pretreatment containers for storing pretreatment specimens obtained by performing pretreatment on the specimens; a reaction table that holds a plurality of reaction containers for causing the pretreatment specimens to react with reagents; a reagent table that holds a plurality of reagent containers for storing the reagents; a specimen dispensing nozzle for delivering the specimens from the specimen containers held on the specimen table to the pretreatment containers held on the pretreatment table; a pretreatment specimen dispensing nozzle for delivering the pretreatment specimens from the pretreatment containers held on the pretreatment table to the reaction containers held on the reaction table; and a reagent dispensing nozzle for delivering the reagents from the reagent table to the reaction containers, the automated analyzer performing pretreatment on the specimens in the pretreatment containers, causing the obtained pretreatment specimens to react with the reagents in the reaction containers, and analyzing components in the specimens, the automated analyzer comprising: a special washing information storage unit that stores special washing information including conditions required for special washing for avoiding carry-over of the pretreatment specimen dispensing nozzle and a washing method for the special washing; a first special washing liquid dispensing unit that dispenses a special washing liquid used for the special washing to the pretreatment containers; a special washing determination unit that determines the necessity of the special washing based on the special washing information and information on the specimens consecutively dispensed by the pretreatment specimen dispensing nozzle, and issues a special washing command; and a special washing control unit that controls the first special washing liquid dispensing unit, the pretreatment table, and the pretreatment specimen dispensing nozzle based on the special washing command from the special washing determination unit for causing the first special washing liquid dispensing unit to dispense the special washing liquid to the pretreatment containers held on the pretreatment table, and for causing the pretreatment specimen dispensing nozzle to suck the special washing liquid from the pretreatment containers storing the special washing liquid.

Hereinafter, embodiments of the invention will be described with reference to FIGS. 1 to 7. In this specification and the drawings, components which are substantially the same and components having substantially the same functions will be denoted by the same reference numerals, and the redundant description thereof will be omitted.

1. Configuration of Automated Analyzer

FIG. 1 is a schematic configuration diagram of an automated analyzer 1 according to an embodiment of the invention.

As illustrated in FIG. 1, the automated analyzer 1 is roughly divided into a measurement mechanism 2 that causes a specimen extracted from a patient to react with a reagent to measure absorbance of the reaction liquid and a control mechanism 3 that controls operations of respective units of the measurement mechanism 2 in respective predetermined cycle periods.

1.1. Measurement Mechanism 2

The measurement mechanism 2 includes a reaction turntable 5 that delivers a reaction container 4 in which a specimen and a reagent react with each other. Around the reaction turntable 5, a specimen turntable 7 that delivers a specimen container 6 that stores a specimen, a dilution turntable 9 that delivers a dilution container 8 (an example of a pretreatment container) that stores a diluted specimen (a dilution specimen), a first reagent turntable 11 that delivers a first reagent container 10 that stores a first reagent, a second reagent turntable 13 that delivers a second reagent container 12 that stores a second reagent are arranged. Furthermore, four dispensing mechanisms to be described later for delivering the specimen, the dilution specimen, the first reagent, and the second reagent are disposed between the respective tables.

The reaction turntable 5 disposed at the center repeatedly rotates by a predetermined angle and stops rotating at certain cycles (for example, cycles of three seconds). The dispensing mechanisms and the turntables around the reaction turntable 5 also operate at cycles of three seconds so as to be able to perform operations such as dispensing with respect to the reaction container 4 on the reaction turntable 5.

A specimen dispensing mechanism 14 disposed between the specimen turntable 7 and the dilution turntable 9 sucks a specimen into a specimen dispensing nozzle 15 (see FIGS. 4B and 4C) provided in the specimen dispensing mechanism 14 from the specimen container 6 delivered to a suction position with rotation of the specimen turntable 7 and discharges the sucked specimen and a dilution liquid (an example of a pretreatment liquid) supplied by the specimen dispensing mechanism 14 itself to an empty dilution container 8 delivered to a discharge position with rotation of the dilution turntable 9. In this way, in the dilution container 8, the specimen is diluted to a lower concentration of a predetermined magnification and a dilution specimen is prepared.

In a cycle subsequent to the cycle in which the dilution specimen is prepared by the specimen dispensing mechanism 14, a first reagent dispensing mechanism 16 disposed between the first reagent turntable 11 and the reaction turntable 5 sucks a first reagent into a first reagent dispensing nozzle (not illustrated) provided in the first reagent dispensing mechanism 16 from the first reagent container 10 delivered to a suction position with rotation of the first reagent turntable 11 and discharges the sucked first reagent to an empty reaction container 4 delivered to a discharge position with rotation of the reaction turntable 5.

In the same cycle as the cycle in which the first reagent is dispensed to the reaction container 4 by the first reagent dispensing mechanism 16, a diluting and stirring mechanism 17 disposed around the dilution turntable 9 inserts a stirring bar (not illustrated) into the dilution container 8 storing the dilution specimen and stirs the dilution specimen therein by rotating the stirring bar. The stirring bar is washed by a stirring bar washing mechanism (not illustrated) disposed near the diluting and stirring mechanism 17 after stirring the dilution specimen.

A diluted specimen dispensing mechanism 18 (an example of a pretreatment specimen dispensing mechanism) disposed between the dilution turntable 9 and the reaction turntable 5 sucks the dilution specimen stirred by the diluting and stirring mechanism 17 into a diluted specimen dispensing nozzle (an example of a pretreatment specimen dispensing nozzle) (not illustrated) provided in the diluted specimen dispensing mechanism 18 from the dilution container 8 delivered to a suction position with rotation of the dilution turntable 9 and discharges the sucked dilution specimen to the reaction container 4 to which the first reagent has been dispensed and which has been delivered to a discharge position with rotation of the reaction turntable 5.

After the first reagent and the dilution specimen react preliminarily in the reaction container 4, a second reagent dispensing mechanism 19 disposed between the second reagent turntable 13 and the reaction turntable 5 sucks a second reagent into a second reagent dispensing nozzle (not illustrated) provided in the second reagent dispensing mechanism 19 from the second reagent container 12 delivered to a suction position with rotation of the second reagent turntable 13 and discharges the sucked second reagent to the reaction container 4 storing the reaction liquid of the first reagent and the dilution specimen, delivered to a discharge position with rotation of the reaction turntable 5. In this way, main reaction starts in the reaction container 4.

The reaction container 4 storing the reaction liquid of the dilution specimen and the reagent passes through a photometric mechanism 20 disposed around the reaction turntable 5 at certain cycles with rotation of the reaction turntable 5. The photometric mechanism 20 includes a light source lamp 20a that radiates light to the reaction container 4 and a multi-wavelength photometer 20b that measures absorbance of the inside of the reaction container 4 radiated with light. The multi-wavelength photometer 20b measures absorbance of the inside of the reaction container 4 passing therethrough at certain cycles and outputs the absorbance to the control mechanism 3. The control mechanism 3 calculates a concentration of an examination item included in the specimen from the absorbance of the reaction liquid of the specimen and the reagent input from the photometric mechanism 20.

A dilution container washing mechanism 21 (an example of a pretreatment container washing mechanism) disposed around the dilution turntable 9 washes the dilution container 8 storing a dilution specimen remaining after a predetermined period has elapsed after the specimen was dispensed and the analysis ends. The details of the configuration of the dilution container washing mechanism 21 will be described later.

Dispensing nozzle washing mechanisms 22 to 25 disposed on the moving trajectories of the respective dispensing nozzles provided in the specimen dispensing mechanism 14, the first reagent dispensing mechanism 16, the diluted specimen dispensing mechanism 18, and the second reagent dispensing mechanism 19, respectively, are used for performing post-dispensing water washing on the dispensing nozzles provided in the dispensing mechanisms 14, 16, 18, and 19 that dispense the specimen or the reagent. The details of the configuration of the dispensing nozzle washing mechanisms 22 to 25 will be described later.

1.2. Control Mechanism 3

The control mechanism 3 includes a control unit 26 connected to the measurement mechanism 2, and an input unit 27, a specimen concentration calculation unit 28, a display unit 29, a storage unit 30, and a special washing determination unit 31 connected to the control unit 26.

The control unit 26 is configured as a CPU or the like and controls the entire automated analyzer 1 including the respective units of the measurement mechanism 2 and the control mechanism 3 and performs control of special washing.

The input unit 27 receives information necessary for analysis of a specimen and instruction information of an analysis operation and outputs these pieces of information to the control unit 26. A mouse, a keyboard, a touch panel, or the like are used for the input unit 27.

The specimen concentration calculation unit 28 calculates a concentration of an examination item included in a specimen based on the information on the absorbance of the reaction liquid of the dilution specimen and the reagent input from the photometric mechanism 20 via the control unit 26.

The display unit 29 displays the concentration of the examination item in the specimen calculated by the specimen concentration calculation unit 28 as an analysis result. Moreover, the display unit 29 displays an inter-specimen carry-over avoidance setting screen 32 for setting special washing information including conditions required for special washing for avoiding carry-over with respect to the specimen dispensing nozzle 15 or the diluted specimen dispensing nozzle and a specimen dispensing nozzle washing mechanism. The details of the inter-specimen carry-over avoidance setting screen 32 will be described later. A display, a printer, a speaker, or the like is used for the display unit 29.

The storage unit 30 is configured as a large-capacity recording device such as a hard disk and stores information input by the input unit 27.

Moreover, the storage unit 30 includes a special washing information storage unit 33 that stores the special washing information set on the inter-specimen carry-over avoidance setting screen 32 and a dilution container content storage unit 34 (an example of a pretreatment container content storage unit) that stores pretreatment container content information of all the dilution containers 8 held on the dilution turntable 9 and updates the information every cycle.

The special washing determination unit 31 determines the necessity of special washing for avoiding carry-over with respect to the specimen dispensing nozzle 15 or the diluted specimen dispensing nozzle based on the information of specimens dispensed in the specimen dispensing nozzle 15 or the diluted specimen dispensing nozzle and the special washing information stored in the special washing information storage unit 33.

1.3. Dilution Container Washing Mechanism 21

Figure 2:
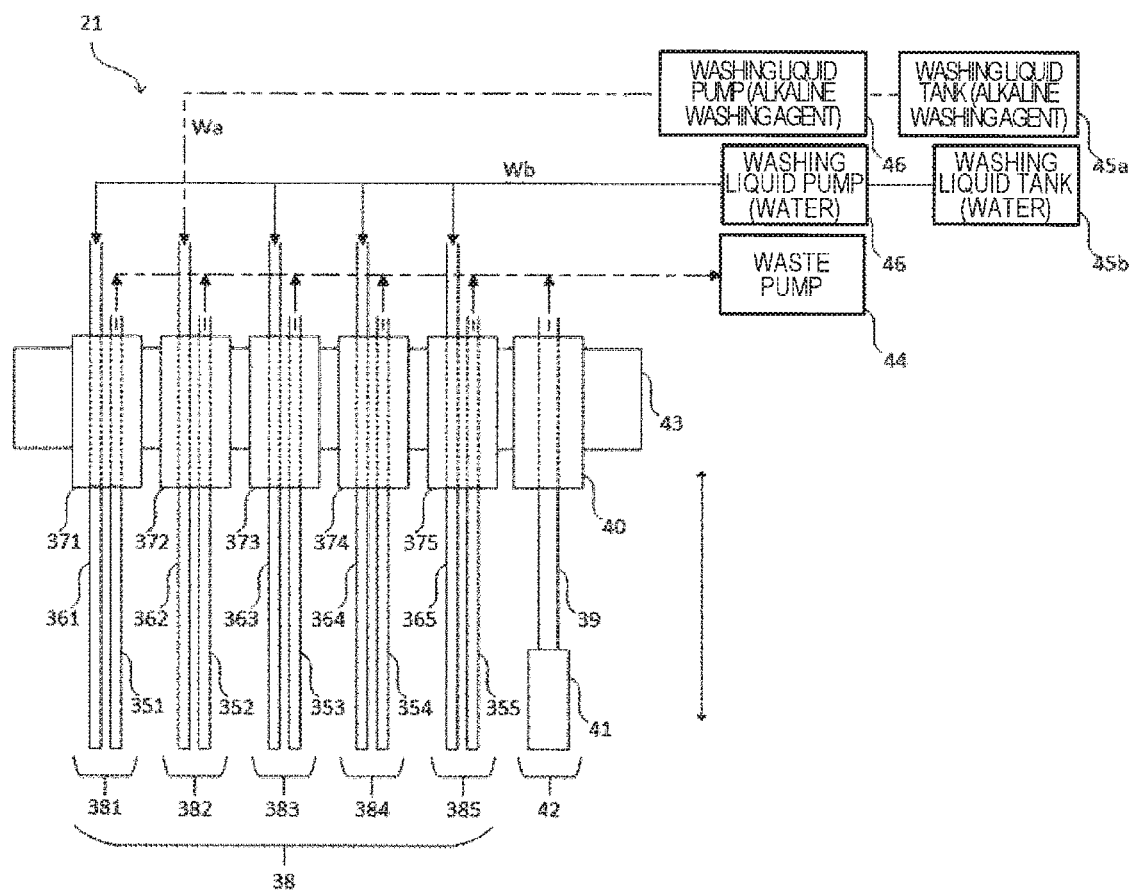
FIG. 2 is an enlarged configuration diagram schematically illustrating a main part of a dilution container washing mechanism according to an embodiment of the invention.

FIG. 2 is an enlarged configuration diagram schematically illustrating a main part of the dilution container washing mechanism 21 according to an embodiment of the invention. As illustrated in FIG. 2, the dilution container washing mechanism 21 includes a washing unit 38$i$ (i=1 to 5) including two nozzles 35$i$ and 36$i$ (i=1 to 5) arranged in parallel and a nozzle supporting portion 37$i$ (i=1 to 5) that supports upper ends of the two nozzles 35$i$ and 36$i$ (i=1 to 5), a drying unit 42 including one nozzle 39, a nozzle supporting portion 40 that supports an upper end of the nozzle 39, and a drying chip 41 connected to a lower end of the nozzle 39 and having a plurality of suction holes formed therein, and an arm 43 that holds five washing units 38$i$ (i=1 to 5) and the drying unit 42. The arm 43 moves upward and downward in a vertical direction with the aid of an arm driving unit (not illustrated).

The two nozzles 35$i$ and 36$i$ (i=1 to 5) of the washing unit 38$i$ (i=1 to 5) include a suction nozzle 35$i$ (i=1 to 5) connected to a waste pump 44 and a washing liquid discharge nozzle 36$i$ (i=1 to 5) connected to a washing liquid tank 45 storing a washing liquid therein via a washing liquid pump 46.

The washing liquid stored in the washing liquid tank 45 may be the same or different depending on the washing unit 38$i$ (i=1 to 5) and water, an alkaline washing agent, or the like is generally used. In this specification, as an example, as illustrated in FIG. 2, one washing liquid discharge nozzle 362 is connected to a washing liquid tank 45$a$ storing an alkaline washing agent Wa therein and four washing liquid discharge nozzles 361 and 363 to 365 are connected to a washing liquid tank 45$b$ storing water Wb therein.

Hereinafter, an overview of an operation of the dilution container washing mechanism 21 will be described.

First, the dilution container 8 which has been analyzed is washed with the water Wb by the washing unit 381. That is, the dilution container 8 which has been analyzed and in which a dilution specimen remains is delivered to a position immediately below the washing unit 381 by the dilution turntable 9. After the arm 43 moves downward and the liquid in the dilution container 8 is sucked and discarded by the suction nozzle 351, the water Wb is discharged from the washing liquid discharge nozzle 361 to the dilution container 8.

Subsequently, the dilution container 8 is washed with the alkaline washing agent Wa by the washing unit 382. That is, the arm 43 moves upward and the dilution container 8 storing the water Wb therein is delivered to a position immediately below the washing unit 382 by the dilution turntable 9. After the arm 43 moves downward and the water Wb in the dilution container 8 is sucked and discarded by the suction nozzle 352, the alkaline washing agent Wa is discharged from the washing liquid discharge nozzle 362 to the dilution container 8.

Subsequently, similarly to the above, the dilution container 8 is delivered sequentially to positions below the washing units 383 to 385, the washing liquid is sucked and discharged by the respective units, the dilution container 8 is washed.

Finally, the inside of the dilution container 8 is dried by the drying unit 42. That is, after the water Wb is discharged to the dilution container 8 by the washing unit 385, the arm 43 moves upward and the dilution container 8 storing the water Wb therein is delivered to a position immediately below the drying unit 42 by the dilution turntable 9. The arm 43 moves downward and the water Wb in the dilution container 8 is sucked and discarded by the drying chip 41, whereby the inside of the dilution container 8 is dried.

1.4. Inter-Specimen Carry-Over Avoidance Setting Screen 32

FIG. 3 illustrates an example of the inter-specimen carry-over avoidance setting screen 32 according to an embodiment of the invention. As illustrated in FIG. 3, the inter-specimen carry-over avoidance setting screen 32 is a screen on which a type (a washing liquid number 49) of a washing liquid used for special washing performed with respect to the specimen dispensing nozzle 15 or the diluted specimen dispensing nozzle and a number of washing times 50 are set in correspondence to a combination of a type or examination item 47 of a specimen material of a specimen which has an influence on carry-over and a type or examination item 48 of a specimen material of a specimen which is influenced by carry-over.

The type of examination item 47 of the specimen material of a specimen which has an influence on carry-over and the type or examination item 48 of the specimen material of a specimen which is influenced by carry-over are configured such that one is selected from types or examination items of specimen materials registered in advance.

The washing liquid number 49 is configured such that a number associated with the type of a washing liquid used for special washing is input. In this specification, as an example, an alkaline washing agent is associated with washing liquid number 1 and an acid washing agent is associated with washing liquid number 2. The number of washing times 50 is configured such that the number of times special washing is performed is input.

According to such a setting as illustrated in FIG. 3, when a specimen to be dispensed is changed from a specimen (serum specimen) of serum to a specimen (urine specimen) of urine, based on the setting of condition number 1 on the inter-specimen carry-over avoidance setting screen 32, the specimen dispensing nozzle 15 or the diluted specimen dispensing nozzle dispenses the serum specimen and is subjected to post-dispensing water washing and special washing is performed once with an alkaline washing agent before the urine specimen is dispensed.

1.5. Dispensing Nozzle Washing Mechanism 22 to 25

Since the dispensing nozzle washing mechanisms 22 to 25 have similar configurations, the configuration of the dispensing nozzle washing mechanisms 22 to 25 will be described by way of an example of the specimen dispensing nozzle washing mechanism 22 disposed on the moving trajectory of the specimen dispensing nozzle 15.

Figure 4C:
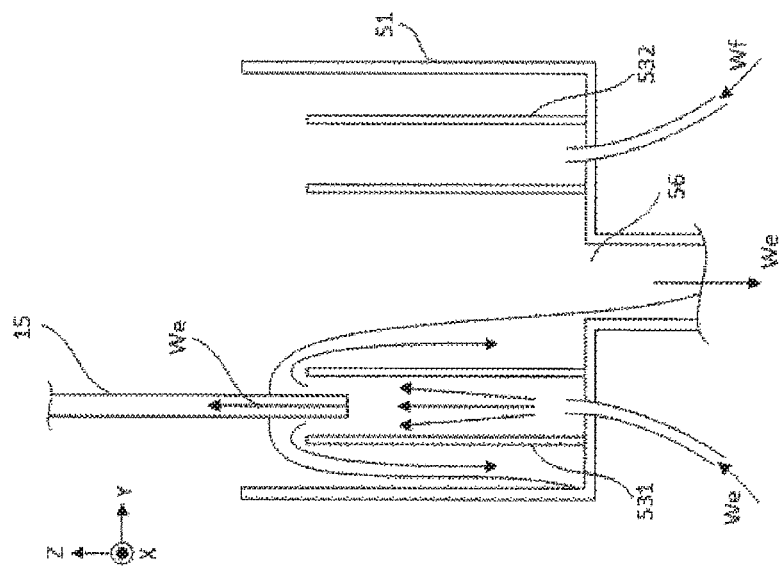
FIGS. 4A to 4C are schematic configuration diagrams of a specimen dispensing nozzle washing mechanism according to an embodiment of the invention.
Figure 4B:
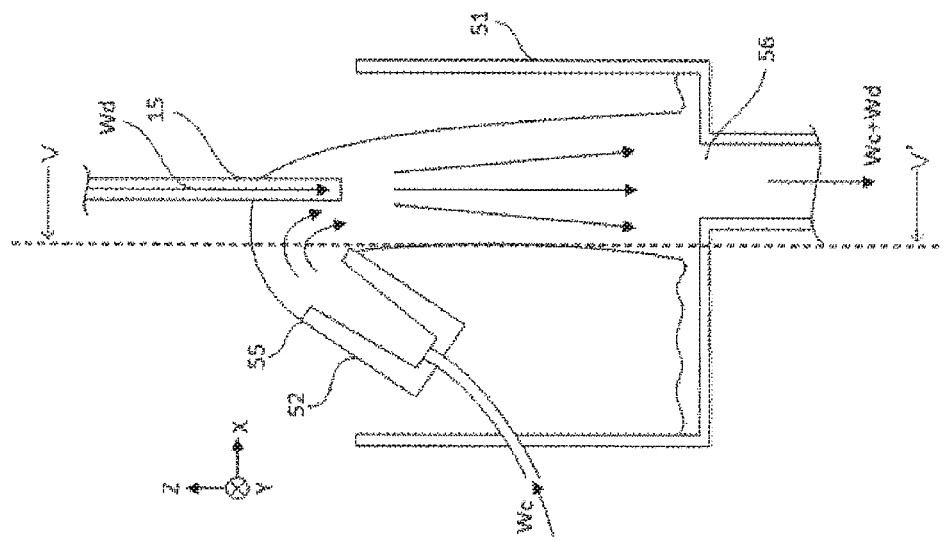
Figure 4A:
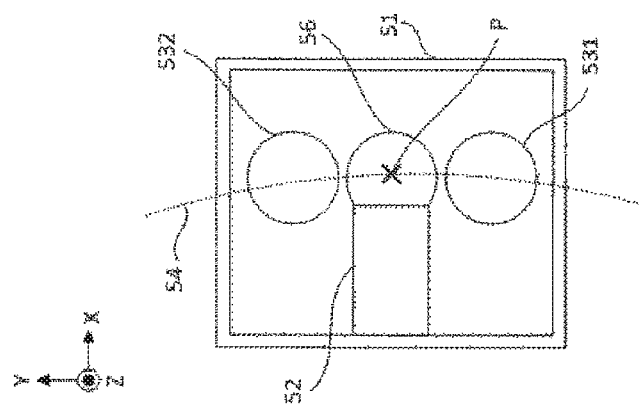

FIGS. 4A to 4C are schematic diagrams of the specimen dispensing nozzle washing mechanism 22 according to an embodiment of the invention, in which FIG. 4A is a top view, FIG. 4B is a front sectional view, and FIG. 4C is a cross-sectional view taken along line V-V' in the front sectional view of FIG. 4B. FIGS. 4B and 4C also illustrate a portion of the specimen dispensing nozzle 15.

As illustrated in FIG. 4A, the specimen dispensing nozzle washing mechanism 22 includes a bucket-shaped washing vessel 51, a washing water supply unit 52 provided on an inner wall side of a side surface of the washing vessel 51, and two washing liquid supply units 531 and 532 (an example of a special washing liquid supply unit) provided on the inner wall side of the bottom surface of the washing vessel 51. The washing liquid supply units 531 and 532 are arranged along a moving trajectory 54 of the specimen dispensing nozzle 15.

As illustrated in FIG. 4B, the washing water supply unit 52 is configured to discharge water We delivered from a washing water pump (not illustrated) and is used for performing post-dispensing water washing with respect to the specimen dispensing nozzle 15.

That is, the specimen dispensing mechanism 14 stops the specimen dispensing nozzle 15 at a position P facing a discharge opening 55 for the water Wc of the washing water supply unit 52 after dispensing a specimen to the dilution container 8 (see FIG. 4A). The washing water supply unit 52 discharges the water Wc in an X-axis direction and washes the specimen remaining on the outer wall of the specimen dispensing nozzle 15. In this case, the specimen dispensing mechanism 14 discharges the dilution liquid Wd supplied from the specimen dispensing mechanism 14 itself from the specimen dispensing nozzle 15 as a washing liquid and washes the specimen remaining on the inner wall of the specimen dispensing nozzle 15.

The water Wc discharged from the washing water supply unit 52 and the dilution liquid Wd discharged from the specimen dispensing nozzle 15 are sucked and discharged into a waste pump (not illustrated) through a discharge opening 56 formed in the bottom surface of the washing vessel 51.

As illustrated in FIG. 4C, the washing liquid supply units 531 and 532 have a tubular shape in which a washing liquid pump (not illustrated) is connected to a lower end and are configured such that washing liquids We and Wf explode out from the upper ends.

The washing liquids We and Wf are used for special washing for avoiding inter-specimen carry-over and an alkaline washing agent, an acid washing agent, or the like is generally used. In this specification, as an example, the washing liquid We is an alkaline washing agent, and the washing liquid Wf is an acid washing agent. FIG. 4C illustrates a state in which the alkaline washing agent We explodes from the washing liquid supply unit 531.

When a combination of specimens corresponding to the setting content of the inter-specimen carry-over avoidance setting screen 32 are dispensed continuously by the specimen dispensing mechanism 14, the specimen dispensing mechanism 14 washes the specimen dispensing nozzle 15 by sucking a washing liquid (hereinafter referred to as a special washing liquid) set on the inter-specimen carry-over avoidance setting screen 32 from the washing liquid supply unit 531 or 532 into the specimen dispensing nozzle 15 before a subsequent specimen which is influenced by carry-over is dispensed.

That is, when the specimen which has an influence on carry-over is dispensed to the dilution container 8 and the specimen dispensing nozzle 15 is subjected to post-dispensing water washing at the position P, the control unit 26 performs control so that a special washing liquid explodes from the washing liquid supply unit 531 or 532 that supplies the special washing liquid. As illustrated in FIG. 4C, the specimen dispensing mechanism 14 moves the specimen dispensing nozzle 15 onto the washing liquid supply unit 531 from which the special washing liquid (the alkaline washing agent We in FIG. 4C) explodes so that the special washing liquid is sucked into the specimen dispensing nozzle 15.

Finally, the specimen dispensing nozzle 15 discharges the sucked special washing liquid to the dilution container 8 and is subjected to post-dispensing water washing at the position P. By doing so, after the specimen dispensing nozzle 15 is washed with the special washing liquid, the special washing liquid remaining on the inner wall and the outer wall of the specimen dispensing nozzle 15 is removed by post-dispensing water washing, and preparation for dispensing the subsequent specimen which is influenced by carry-over is completed.

A first reagent dispensing nozzle washing mechanism 23 and a second reagent dispensing nozzle washing mechanism 25 disposed on the moving trajectories of the first reagent dispensing nozzle and the second reagent dispensing nozzle have a similar configuration to the configuration of the specimen dispensing nozzle washing mechanism 22 and include washing liquid supply units 531 and 532 that supply the special washing liquid, respectively. On the other hand, a diluted specimen dispensing nozzle washing mechanism 24 disposed on the moving trajectory of the diluted specimen dispensing nozzle has a configuration in which the washing liquid supply units 531 and 532 are excluded from the configuration of the specimen dispensing nozzle washing mechanism 22.

An example of an operation when the automated analyzer 1 having the above-described configuration avoids inter-specimen carry-over via the diluted specimen dispensing nozzle will be described below.

2. First Embodiment

As a first embodiment of the invention, a case in which special washing information is set on the inter-specimen carry-over avoidance setting screen 32 such that special washing using an alkaline washing agent is performed once with respect to the specimen dispensing nozzle 15 or the diluted specimen dispensing nozzle when a specimen to be dispensed is changed from a specimen A to a specimen B, and after the specimen A is dispensed from the specimen container 6 to the dilution container 8, the specimen B is dispensed from the specimen container 6 to the dilution container 8, and the respective specimens are analyzed will be described.

FIGS. 5A and 5B are diagrams for describing an operation of the automated analyzer 1 for avoiding inter-specimen carry-over via the diluted specimen dispensing nozzle according to the first embodiment of the invention, Specifically, FIG. 5A illustrates operation contents, in respective cycles, of the specimen dispensing mechanism 14, the diluting and stirring mechanism 17, and the diluted specimen dispensing mechanism 18 in partial cycle periods in which specimens X to Z and specimens A to D are analyzed sequentially, and FIG. 5B illustrates information stored in the dilution container content storage unit 34 in respective cycles.

An analyzer operation cycle 57 (see FIGS. 5A and 5B) illustrate the orders of cycles of the automated analyzer 1. The specimen dispensing mechanism 14, the diluting and stirring mechanism 17, and the diluted specimen dispensing mechanism 18 operate in the order of cycle numbers (1) to (5), and the operation contents in the respective cycles are described in specimen dispensing mechanism operation 58, diluting and stirring mechanism operation 59, and diluted specimen dispensing mechanism operation 60 in FIG. 5A.

For example, in Cycle (1), the specimen dispensing mechanism 14 dispenses the specimen A from the specimen container 6 to the dilution container 8, the diluting and stirring mechanism 17 stirs the specimen Z dispensed to the dilution container 8 one cycle before Cycle (1), and the diluted specimen dispensing mechanism 18 dispenses the specimen Y dispensed to and stirred in the dilution container 8 two cycles before Cycle (1) from the dilution container 8 to the reaction container 4. After that, the specimen dispensing mechanism 14, the diluting and stirring mechanism 17, and the diluted specimen dispensing mechanism 18 perform operations described in the row of Cycle (2) in FIG. 5A.

A dilution container number N (see FIG. 5B) indicates a number for identifying the dilution container 8 held in the dilution turntable 9. In this specification, a total of twenty five dilution containers 8 are used for the sake of convenience, and dilution container numbers 1 to 25 are assigned to identify the respective twenty five dilution containers 8.

Cells on the row of the respective dilution container numbers N indicate pretreatment container content information of the dilution container 8 of the dilution container number N stored in the dilution container content storage unit 34 for each cycle. "A" to "D" and "X" to "Z" indicate specimen types (Specimens A to D and Specimens X to Z). For example, the dilution container 8 of dilution container number 1 in Cycle (1) indicates that diluted specimen A is stored therein.

"a" indicates an alkaline washing agent. For example, the dilution container 8 of dilution container number 2 in Cycle (2) indicates that an alkaline washing agent is stored therein. Blanks indicate that nothing is stored in the dilution container 8.

Portions surrounded by a bold frame indicate that the dilution containers 8 in the portions surrounded by a bold frame are washed by the dilution container washing mechanism 21. "w" in the bold frame indicates water Wb discharged from the washing liquid discharge nozzles 361 and 363 to 365 of the dilution container washing mechanism 21, "a" in the bold frame indicates an alkaline washing agent Wa discharged from the washing liquid discharge nozzle 362 of the dilution container washing mechanism 21, and a blank in the bold frame indicates that the inside of the dilution container 8 is dried by the drying unit 42 of the dilution container washing mechanism 21 and nothing is stored in the dilution container 8.

Hereinafter, the flow of operations of the automated analyzer 1 when avoiding carry-over via the diluted specimen dispensing nozzle from the specimen A to the specimen B will be described with reference to FIGS. 5A and 5B.

The control unit 26 determines operation contents up to several cycles before, of respective units of the measurement mechanism 2 by comparing information on an analysis order, information on a specimen material type, and information on an examination item type to be analyzed of a specimen requested for analysis, with the special washing information stored in the special washing information storage unit 33 before or during the operation of the measurement mechanism 2.

In Cycle (1), the specimen A is dispensed from the specimen container 6 to the dilution container 8. That is, the specimen dispensing mechanism 14 dispenses the specimen A stored in the specimen container 6 to a dilution container (No. 1) together with a dilution liquid. After that, the specimen dispensing nozzle 15 is subjected to post-dispensing water washing in the specimen dispensing nozzle washing mechanism 22.

In Cycle (1), the dilution container content storage unit 34 updates the information on a content of the dilution container 8 of distribution destination 1 from "blank" to "specimen A". Hereinafter, in the description of respective cycles, although the dilution container content storage unit 34 updates the information on the content of the dilution container 8 whenever a liquid is dispensed to the dilution container 8, the description thereof will be omitted.

In Cycle (2), the specimen dispensing nozzle 15 is washed with an alkaline washing agent based on the special washing information. That is, the special washing determination unit 31 determines that special washing of the specimen dispensing nozzle is necessary and issues a special washing command, and the control unit 26 performs control such that the alkaline washing agent We is sucked from the washing liquid supply unit 531 of the specimen dispensing nozzle washing mechanism 22 into the specimen dispensing nozzle 15, and then, the alkaline washing agent We is discharged from the specimen dispensing nozzle 15 to a dilution container (No. 2) based on the special washing command. After that, the specimen dispensing nozzle 15 is subjected to post-dispensing water washing in the specimen dispensing nozzle washing mechanism 22.

The dilution container 8 to which the special washing liquid is dispensed continues moving with rotation of the dilution turntable 9 with the special washing liquid stored therein similarly to a case where a specimen is dispensed, and is washed by the dilution container washing mechanism 21 when its turn comes after a predetermined period has elapsed.

In Cycle (2), the diluting and stirring mechanism 17 stirs the specimen A dispensed to and stirred in the dilution container (No. 1).

In Cycle (3), the specimen B is dispensed from the specimen container 6 to the dilution container 8. That is, the specimen dispensing mechanism 14 dispenses the specimen B stored in the specimen container 6 to a dilution container (No. 3) together with a dilution liquid. After that, the specimen dispensing nozzle 15 is subjected to post-dispensing water washing in the specimen dispensing nozzle washing mechanism 22.

In Cycle (3), the diluting and stirring mechanism 17 stirs the alkaline washing agent We dispensed to the dilution container (No. 2).

In Cycle (3), the diluted specimen A is dispensed from the dilution container 8 to the reaction container 4. That is, the diluted specimen dispensing mechanism 18 dispenses the diluted specimen A from the dilution container (No. 1) to the reaction container 4. After that, the diluted specimen dispensing nozzle is subjected to post-dispensing water washing in the diluted specimen dispensing nozzle washing mechanism 24.

In Cycle (4), the diluted specimen dispensing nozzle is washed with the alkaline washing agent used for special washing of the specimen dispensing nozzle 15 based on the special washing information. That is, the special washing determination unit 31 determines that special washing of the diluted specimen dispensing nozzle is necessary and issues a special washing command, and the control unit 26 controls the dilution turntable 9 so that the dilution container (No. 2) storing the alkaline washing agent We used for special washing of the specimen dispensing nozzle 15 is delivered to a suction position of the diluted specimen dispensing nozzle based on the special washing command.

The diluted specimen dispensing mechanism 18 sucks the alkaline washing agent We from the dilution container (No. 2) to the diluted specimen dispensing nozzle, moves the diluted specimen dispensing nozzle to the position P of the diluted specimen dispensing nozzle washing mechanism 24, and discharges and discards the alkaline washing agent We sucked from the diluted specimen dispensing nozzle. After that, the diluted specimen dispensing nozzle is subjected to post-dispensing water washing in the diluted specimen dispensing nozzle washing mechanism 24.

In Cycle (5), the diluted specimen B is dispensed from the dilution container 8 to the reaction container 4. That is, the diluted specimen dispensing mechanism 18 dispenses the diluted specimen B from the dilution container (No. 3) to the reaction container 4. After that, the diluted specimen dispensing nozzle is subjected to post-dispensing water washing in the diluted specimen dispensing nozzle washing mechanism 24.

According to the first embodiment, even when a mechanism for supplying a special washing liquid is not provided near the diluted specimen dispensing nozzle, special washing is performed with respect to the diluted specimen dispensing nozzle based on the special washing information set on the inter-specimen carry-over avoidance setting screen 32, and inter-specimen carry-over via the diluted specimen dispensing nozzle is avoided. Moreover, since the washing liquid used for washing the specimen dispensing nozzle 15 is used for washing the diluted specimen dispensing nozzle, the amount of the washing liquid used is reduced.

3. Second Embodiment

As a second embodiment of the invention, a case in which special washing information is set on the inter-specimen carry-over avoidance setting screen 32 such that special washing using an alkaline washing agent is performed once with respect to the specimen dispensing nozzle 15 or the diluted specimen dispensing nozzle when a specimen to be dispensed is changed from a specimen B to a specimen X, reexamination of the specimen X which has been analyzed earlier than the specimen B is necessary, and after the specimen B is dispensed from the dilution container 8 to the reaction container 4, the specimen X is dispensed again from the dilution container 8 to the reaction container 4 so that the specimen X is reexamined, and the respective specimens are analyzed will be described.

Here, an operation example of reexamination will be described. After a first analysis result of the specimen is calculated by the specimen concentration calculation unit 28, the control unit 26 compares the first analysis result with a threshold set in advance for each examination item and determines whether reexamination is necessary for the specimen. The specimen for which it is determined that reexamination is necessary is considered that analysis is not completed, and the control unit 26 performs control so that the dilution container 8 storing the dilution specimen prepared during the first analysis of the specimen is not washed by the dilution container washing mechanism 21.

Subsequently, the control unit 26 causes the reexamination target specimen to cut into the line of specimens waiting for the first analysis during the operation of the measurement mechanism 2. The control unit 26 determines operation contents up to several cycles before, of the respective units of the measurement mechanism 2 by comparing information on an analysis order, information on a specimen material, and information on an examination item type to be analyzed of the specimens waiting for the first analysis and the reexamination target specimen, with the special washing information stored in the special washing information storage unit 33 before or during the operation of the measurement mechanism 2.

When an analysis operation of the reexamination target specimen is performed, the control unit 26 performs control so that the dilution specimen prepared during the first analysis logic, remaining in the dilution container 8 is analyzed again. With the above-described operation, the specimen for which it is determined that reexamination is necessary is quickly subjected to reexamination without preparing a dilution specimen again.

FIGS. 6A and 6B are diagrams for describing an operation of the automated analyzer 1 for avoiding inter-specimen carry-over via the diluted specimen dispensing nozzle according to the second embodiment of the invention, Specifically, FIG. 6A illustrates operation contents, in respective cycles, of the specimen dispensing mechanism 14, the diluting and stirring mechanism 17, and the diluted specimen dispensing mechanism 18 in partial cycle periods in which specimens X to Z and specimens A to F are analyzed sequentially, and FIG. 6B illustrates information stored in the dilution container content storage unit 34 in respective cycles.

Hereinafter, the flow of operations of the automated analyzer 1 when avoiding carry-over via the diluted specimen dispensing nozzle from the specimen B to the specimen X will be described with reference to FIGS. 6A and 6B. However, the operation (Cycles (6) and (7) in FIG. 6A) of avoiding carry-over from the specimen B to the specimen X performed in the second embodiment is performed subsequently to Cycle (5) of the first embodiment, and the description of the operation (Cycle (5)) overlapping that of the first embodiment will be omitted.

The specimen X is a specimen which has been dispensed from the specimen container 6 to a dilution container (No. 23) and has been diluted in the dilution container in a cycle earlier than Cycle (1), and then, has been dispensed from the dilution container (No. 23) to the reaction container 4 and has been analyzed (see FIG. 6B).

After the specimen B is dispensed by the diluted specimen dispensing mechanism 18 from the dilution container (No. 3) to the reaction container 4 in Cycle (5), when reexamination of the specimen X is performed, the diluted specimen dispensing nozzle is washed with an alkaline washing agent based on the special washing information in Cycle (6).

Specifically, first, at the start of Cycle (6), the special washing determination unit 31 determines that special washing of the diluted specimen dispensing nozzle is necessary, and the control unit 26 reads the pretreatment container content information (Cycle (6) of FIG. 6B) of the dilution container 8 from the dilution container content storage unit 34 and checks whether a dilution container 8 storing a special washing liquid (the alkaline washing agent in the second embodiment) is present in the twenty five dilution containers 8 held in the dilution turntable 9.

In the example illustrated in FIG. 6B, it is confirmed that the dilution container (No. 2) stores the alkaline washing agent We. The alkaline washing agent We is an agent which has been used for washing the specimen dispensing nozzle 15 in order to avoid carry-over from the specimen A to the specimen B in Cycle (2) and which remains on the dilution turntable 9 until washing is performed after a predetermined period has elapsed (see FIG. 5A).

In this way, when the dilution container 8 storing the special washing liquid is present on the dilution turntable 9, the diluted specimen dispensing nozzle is washed with the special washing liquid stored in the dilution container 8. That is, the control unit 26 controls the dilution turntable 9 so that the dilution container (No. 2) storing the alkaline washing agent We is delivered to the suction position of the diluted specimen dispensing nozzle.

The diluted specimen dispensing mechanism 18 sucks the alkaline washing agent We from the dilution container (No. 2) to the diluted specimen dispensing nozzle, moves the diluted specimen dispensing nozzle to the position P of the diluted specimen dispensing nozzle washing mechanism 24, and discharges and discards the alkaline washing agent We sucked from the diluted specimen dispensing nozzle. After that, the diluted specimen dispensing nozzle is subjected to post-dispensing water washing in the diluted specimen dispensing nozzle washing mechanism 24. The above-described operations are performed in Cycle (6).

A case in which the dilution container 8 storing the special washing liquid is not present on the dilution turntable 9 in Cycle (6) will be described later.

In Cycle (7), an operation of reexamining the specimen X is performed. That is, the diluted specimen dispensing mechanism 18 dispenses the diluted specimen X from the dilution container (No. 23) to the reaction container 4. After that, the diluted specimen dispensing nozzle is subjected to post-dispensing water washing in the diluted specimen dispensing nozzle washing mechanism 24.

According to the second embodiment, even when a mechanism for supplying a special washing liquid is not provided near the diluted specimen dispensing nozzle, special washing is performed with respect to the diluted specimen dispensing nozzle based on the special washing information set on the inter-specimen carry-over avoidance setting screen 32, and inter-specimen carry-over via the diluted specimen dispensing nozzle is avoided. Moreover, since the special washing liquid used for washing the specimen dispensing nozzle 15 and the diluted specimen dispensing nozzle in the first embodiment is reused for washing the diluted specimen dispensing nozzle, it is possible to prevent a reduction in processing performance and to reduce the amount of the special washing liquid used as compared to when the special washing liquid is not reused but is dispensed to the dilution container 8.

4. Case where Dilution Container 8 Storing Special Washing Liquid is not Present on Dilution Turntable 9 in Cycle (6) of Second Embodiment In the inter-specimen carry-over avoidance setting screen 32 of the second embodiment, it is assumed that the special washing information is set in advance such that when a specimen to be dispensed is changed from the specimen B to the specimen X, special washing with an acid washing agent is performed once with respect to the specimen dispensing nozzle 15 or the diluted specimen dispensing nozzle.

FIG. 7 is a diagram for describing an operation of the automated analyzer 1 for avoiding inter-specimen carry-over via the diluted specimen dispensing nozzle according to the second embodiment of the invention when the dilution container 8 storing the special washing liquid is not present on the dilution turntable 9. Specifically, FIG. 7 illustrates operation contents, in respective cycles, of the diluted specimen dispensing mechanism 18 and the first reagent dispensing mechanism 16 in partial cycle periods by diluted specimen dispensing mechanism operation 60 and first reagent dispensing mechanism operation 61.

In cycle (6), the control unit 26 checks the presence of the dilution container 8 storing an acid washing agent as a special washing liquid on the dilution turntable 9 based on the special washing information. When it is determined that the dilution container 8 is not present, the special washing liquid is prepared in the reaction container 4 by the first reagent dispensing mechanism 16.

That is, the first reagent dispensing mechanism 16 sucks an acid washing agent Wf from the washing liquid supply unit 532 of the first reagent dispensing nozzle washing mechanism 23 to the first reagent dispensing nozzle and then, discharges the acid washing agent Wf from the first reagent dispensing nozzle to the reaction container 4.

In Cycle (7) the diluted specimen dispensing nozzle is washed with the acid washing agent Wf. That is, the diluted specimen dispensing mechanism 18 sucks the acid washing agent Wf into the diluted specimen dispensing nozzle from the reaction container 4 to which the acid washing agent Wf has been dispensed in Cycle (6) and which has been delivered to a discharge position of the diluted specimen dispensing nozzle, moves the diluted specimen dispensing nozzle to the position P of the diluted specimen dispensing nozzle washing mechanism 24, and discharges and discards the acid washing agent Wf sucked from the diluted specimen dispensing nozzle. After that, the diluted specimen dispensing nozzle is subjected to post-dispensing water washing in the diluted specimen dispensing nozzle washing mechanism 24.

In Cycle (8), an operation of reexamining the specimen X is performed similarly to the second embodiment.

With the above-described operations, even when the dilution container 8 storing the special washing liquid is not present on the dilution turntable 9, inter-specimen carry-over via the diluted specimen dispensing nozzle is avoided.

In the automated analyzer 1 according to the embodiment of the invention, since respective liquids are dispensed to the reaction container 4 in the order of a first reagent, a dilution specimen, and a second alkaline washing agent, the reaction container 4 to which the acid washing agent Wf has been dispensed in Cycle (6) is delivered to a position (a discharge position) that the diluted specimen dispensing nozzle can access in Cycle (7). Therefore, it is not necessary to add special control for special washing to the reaction turntable 5, and the above-described operations can be performed.

5. Additional Explanation of First and Second Embodiments

Although the washing liquid supply units 531 and 532 provided in the specimen dispensing nozzle washing mechanism 22 and the first reagent dispensing nozzle washing mechanism 23, respectively have been described as an example of a supply source of the washing liquid used for switch portion for avoiding inter-specimen carry-over via the specimen dispensing nozzle 15 or the diluted specimen dispensing nozzle, the washing liquid supply source is not limited thereto. The invention may be implemented by arranging a container storing a special washing liquid at positions at which the specimen dispensing nozzle 15 and the first reagent dispensing nozzle can suck the special washing liquid. For example, the container storing the special washing liquid may be provided on the specimen turntable 7 and the first reagent turntable 11.

The special washing liquid set on the inter-specimen carry-over avoidance setting screen 32 is not limited to only one type. For example, washing using an alkaline washing agent and water may be set, and after the specimen dispensing nozzle 15 or the diluted specimen dispensing nozzle sucks and discharges the alkaline washing agent We exploded from the washing liquid supply unit 531 and is subjected to post-dispensing water washing, the specimen dispensing nozzle 15 or the diluted specimen dispensing nozzle may be washed with the water We discharged from the washing water supply unit 52 and the water or the dilution liquid Wd supplied from the respective dispensing mechanisms themselves. Moreover, another washing method may be set on the inter-specimen carry-over avoidance setting screen 32 so that different numbers of washing times may be set to the specimen dispensing nozzle 15 and the diluted specimen dispensing nozzle.

Although the special washing liquid dispensed to the dilution container 8 by the specimen dispensing nozzle 15 is used for special washing of the diluted specimen dispensing nozzle, a washing liquid discharged to the dilution container 8 by the dilution container washing mechanism 21 may be used as a special washing liquid. For example, the dilution container (No. 9) in Cycle (4) of the first embodiment and the dilution container (No. 11) in Cycle (6) of the second embodiment store the alkaline washing agent Wa discharged from the washing liquid discharge nozzle 362 of the dilution container washing mechanism 21. The alkaline washing agent Wa may be used as the special washing liquid.

In the second embodiment, when the dilution container 8 storing the special washing liquid is not present on the dilution turntable 9, the special washing liquid is prepared in the reaction container 4 by the first reagent dispensing mechanism 16. However, as a method of preparing the special washing liquid, the special washing liquid may be dispensed from the washing liquid supply units 531 and 532 to the dilution container 8 by the specimen dispensing mechanism 14. Moreover, the washing liquid may be discharged to the dilution container 8 by the dilution container washing mechanism 21 as the special washing liquid.

Although the timing at which the control unit 26 checks whether the dilution container 8 storing the special washing liquid is present on the dilution turntable 9 in order to avoid inter-specimen carry-over via the diluted specimen dispensing nozzle is a cycle (Cycle (4) in the first embodiment and Cycle (6) in the second embodiment) subsequent to the cycle in which the diluted specimen dispensing mechanism 18 dispenses a specimen which has an influence on carry-over from the dilution container 8 to the reaction container 4, the timing is not limited thereto.

As described above, the control unit 26 determines the operation contents up to several cycles before, of the respective units of the measurement mechanism 2 before and during the operation of the measurement mechanism 2. In this case, the control unit 26 predicts the internal states of all the dilution containers 8 in the respective cycles up to several cycles before based on the determined operation contents and checks whether the dilution container 8 storing the special washing liquid is present on the dilution turntable 9 in a cycle subsequent to a cycle in which the diluted specimen dispensing mechanism 18 dispenses a specimen which has an influence on carry-over from the dilution container 8 to the reaction container 4.

When it is determined that the dilution container 8 storing the special washing liquid is not present, the control unit 26 determines the operation contents so that the first reagent dispensing mechanism 16 dispenses the special washing liquid from the washing liquid supply units 531 and 532 to the reaction container 4 in a cycle (Cycle (3) in the first embodiment and Cycle (5) in the second embodiment) in which the diluted specimen dispensing mechanism 18 dispenses a specimen which has an influence on carry-over from the dilution container 8 to the reaction container 4.

By doing so, it is possible to save a period (see Cycle (6) in FIG. 7) of waiting until the special washing liquid is dispensed to the reaction container 4 and to perform special washing with respect to the diluted specimen dispensing nozzle without decreasing the processing performance.

The invention is not limited to the above-described embodiments and various modifications can be made within the scope of the invention.

For example, in the above-described embodiments, although a dilution specimen obtained by diluting a specimen has been described as an example of a pretreatment specimen obtained by performing pretreatment on a specimen, the pretreatment specimen is not limited thereto. For example, the pretreatment specimen may be a specimen obtained by hemolyzing blood corpuscle components. In this case, for example, blood corpuscle components of a specimen which has been centrifuged and precipitated and a hemolyzing agent (an example of a pretreatment liquid) are mixed in the pretreatment container to hemolyze the blood corpuscle components of the specimen, the hemolyzed specimen (an example of the pretreatment specimen) is dispensed to the reaction container, and the hemolyzed specimen is analyzed by allowing it to react with a reagent.

In the above-described embodiments, although a case in which the specimen dispensing mechanism 14 dispenses the sucked specimen to the dilution container 8 together with a dilution liquid has been described as an example of pretreatment, for example, when dilution is not necessary, the specimen dispensing mechanism 14 may dispense the sucked specimen only to the dilution container 8 as pretreatment.

For example, in the above-described embodiments, although a case in which a reaction table that delivers the reaction container 4 is the reaction turntable 5 that delivers the reaction container 4 with rotation of the reaction table has been described, the reaction table that delivers the reaction container 4 is not limited thereto. The reaction table may be a table that delivers the reaction container 4 linearly, for example.

In the above-described embodiments, although a case in which a specimen table that delivers the specimen container 6 is the specimen turntable 7 that delivers the specimen container 6 with rotation of the specimen table has been described, the specimen table that delivers the specimen container 6 is not limited thereto. The specimen table may be a table that delivers the specimen container 6 linearly, for example.

In the above-described embodiments, although a case in which a pretreatment table that delivers the dilution container 8 is the dilution turntable 9 that delivers the dilution container 8 with rotation of the dilution table has been described, the pretreatment table that delivers the dilution container 8 is not limited thereto. The pretreatment table may be a table that delivers the dilution container 8 linearly, for example.

In the above-described embodiment, although a case in which a reagent table that delivers the first reagent container 10 is the reagent turntable 11 that delivers the first reagent container 10 with rotation of the reagent table has been described, the reagent table that delivers the first reagent container 10 is not limited thereto. The reagent table may be a table that delivers the first reagent container 10 linearly, for example. The same is true to the reagent table that delivers the second reagent container 12.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

The invention claimed is:

1. An automated analyzer comprising:
a specimen table that holds a plurality of specimen containers for storing specimens;
a pretreatment table that holds a plurality of pretreatment containers for storing pretreatment specimens obtained by performing pretreatment on the specimens;
a reaction table that holds a plurality of reaction containers for causing the pretreatment specimens to react with reagents;
a reagent table that holds a plurality of reagent containers for storing the reagents;
a specimen dispensing nozzle for delivering the specimens from the specimen containers held on the specimen table to the pretreatment containers held on the pretreatment table;
a pretreatment specimen dispensing nozzle for delivering the pretreatment specimens from the pretreatment containers held on the pretreatment table to the reaction containers held on the reaction table; and
a reagent dispensing nozzle for delivering the reagents from the reagent table to the reaction containers,
the automated analyzer performing pretreatment on the specimens in the pretreatment containers, causing the obtained pretreatment specimens to react with the reagents in the reaction containers, and analyzing components in the specimens, the automated analyzer further comprising:
a special washing information storage unit that stores special washing information comprising conditions required for special washing for avoiding carry-over of the pretreatment specimen dispensing nozzle and a washing method for the special washing;
a first special washing liquid dispensing unit that dispenses a special washing liquid used for the special washing to the pretreatment containers, wherein, when the pretreatment containers storing the special washing liquid are present on the pretreatment table, the first special washing liquid dispensing unit does not dispense the special washing liquid to the pretreatment containers;
a special washing determination unit that determines that the special washing is necessary based on the special washing information and information on the specimens consecutively dispensed by the pretreatment specimen dispensing nozzle, wherein the information on the specimens consecutively dispensed by the pretreatment specimen dispensing nozzle comprises information indicating that a first specimen dispensed by the pretreatment specimen dispensing nozzle is of a different type of specimen material than a second specimen to be dispensed by the pretreatment specimen dispensing nozzle after the first specimen is dispensed, and issues a special washing command based on determining that the special washing is necessary;
a special washing control unit that controls the first special washing liquid dispensing unit, the pretreatment table, and the pretreatment specimen dispensing nozzle based on the special washing command from the special washing determination unit for causing the first special washing liquid dispensing unit to dispense the special washing liquid to the pretreatment containers held on the pretreatment table, and for causing the pretreatment specimen dispensing nozzle to suck the special washing liquid from the pretreatment containers storing the special washing liquid; and
a pretreatment container content storage unit that stores pretreatment container content information indicating whether each of the pretreatment containers stores the special washing liquid, with respect to all the pretreatment containers held on the pretreatment table,
wherein after receiving the special washing command, the special washing control unit:
determines whether the pretreatment containers storing the special washing liquid are present on the pretreatment table based on the pretreatment container content information; and
when the pretreatment containers are present, controls the pretreatment specimen dispensing nozzle for causing the pretreatment specimen dispensing nozzle to suck the special washing liquid stored in the pretreatment containers, without causing the first special washing liquid dispensing unit to dispense the special washing liquid to the pretreatment containers.

2. The automated analyzer according to claim 1, wherein after receiving the special washing command, the special washing control unit determines whether the pretreatment containers storing the special washing liquid are present on the pretreatment table based on the pretreatment container content information, and when the pretreatment containers are not present, controls the first special washing liquid dispensing unit, the pretreatment table, and the pretreatment specimen dispensing nozzle for causing the first special washing liquid dispensing unit to dispense the special washing liquid to the pretreatment containers held on the pretreatment table and for causing the pretreatment specimen dispensing nozzle to suck the special washing liquid from the pretreatment containers.

3. The automated analyzer according to claim 1, further comprising:

a second special washing liquid dispensing unit that dispenses the special washing liquid to the reaction containers, wherein after receiving the special washing command, the special washing control unit determines whether the pretreatment containers storing the special washing liquid are present on the pretreatment table based on the pretreatment container content information, and when the pretreatment containers are not present, controls the second special washing liquid dispensing unit and the pretreatment specimen dispensing nozzle for causing the second special washing liquid dispensing unit to dispense the special washing liquid to the reaction containers held on the reaction table and for causing the pretreatment specimen dispensing nozzle to suck the special washing liquid from the reaction containers.

4. The automated analyzer according to claim 1, further comprising a special washing liquid supply unit for the specimen dispensing nozzle that supplies the special washing liquid, the specimen dispensing nozzle being able to suck the special washing liquid from the special washing liquid supply unit for the specimen dispensing nozzle, wherein the special washing control unit controls the specimen dispensing nozzle, the special washing liquid supply unit for the specimen dispensing nozzle, the pretreatment table, and the pretreatment specimen dispensing nozzle based on the special washing command from the special washing determination unit for causing the specimen dispensing nozzle as the first special washing liquid dispensing unit to dispense the special washing liquid from the special washing liquid supply unit for the specimen dispensing nozzle to the pretreatment containers, and for causing the pretreatment specimen dispensing nozzle to suck the special washing liquid from the pretreatment containers.

5. The automated analyzer according to claim 1, further comprising a pretreatment container washing mechanism including a discharge nozzle that discharges a washing liquid to the pretreatment containers held on the pretreatment table, and a suction nozzle that sucks the washing liquid, wherein the special washing control unit controls the pretreatment container washing mechanism, the pretreatment table, and the pretreatment specimen dispensing nozzle based on the special washing command from the special washing determination unit for causing the discharge nozzle of the pretreatment container washing mechanism to be used as the first special washing liquid dispensing unit, and for causing the pretreatment specimen dispensing nozzle to suck, as the special washing liquid, the washing liquid from the pretreatment containers storing the washing liquid from the discharge nozzle.

6. The automated analyzer according to claim 3, further comprising a special washing liquid supply unit for the reagent dispensing nozzle that supplies the special washing liquid, the reagent dispensing nozzle being able to suck the special washing liquid from the special washing liquid supply unit for the reagent dispensing nozzle, wherein the special washing control unit controls the reagent dispensing nozzle, the special washing liquid supply unit for the reagent dispensing nozzle, the reaction table, and the pretreatment specimen dispensing nozzle based on the special washing command from the special washing determination unit for causing the reagent dispensing nozzle as the second special washing liquid dispensing unit to dispense the special washing liquid from the special washing liquid supply unit for the reagent dispensing nozzle to the reaction containers and for causing the pretreatment specimen dispensing nozzle to suck the special washing liquid from the reaction containers.

7. An automated analyzer comprising:

a specimen table that holds a plurality of specimen containers for storing specimens;

a pretreatment table that holds a plurality of pretreatment containers for storing pretreatment specimens obtained by performing pretreatment on the specimens;

a reaction table that holds a plurality of reaction containers for causing the pretreatment specimens to react with reagents;

a reagent table that holds a plurality of reagent containers for storing the reagents;

a specimen dispensing mechanism comprising a specimen dispensing nozzle that delivers the specimens from the specimen containers held on the specimen table to the pretreatment containers held on the pretreatment table;

a specimen dispensing nozzle washing mechanism comprising a plurality of washing liquid supply units;

a pretreatment specimen dispensing mechanism comprising a pretreatment specimen dispensing nozzle that delivers the pretreatment specimens from the pretreatment containers held on the pretreatment table to the reaction containers held on the reaction table;

a pretreatment specimen dispensing nozzle washing mechanism comprising a washing water supply unit;

a first special washing liquid dispensing unit that dispenses a special washing liquid used for special washing to the pretreatment containers;

a special washing information storage unit that stores special washing information comprising conditions required for special washing for avoiding carry-over of the pretreatment specimen dispensing nozzle and a washing method for special washing for avoiding carry-over of the pretreatment specimen dispensing nozzle;

a special washing determination unit that determines that special washing of the pretreatment specimen dispensing nozzle is necessary based on the special washing information and information on the specimens consecutively dispensed by the pretreatment specimen dispensing nozzle, wherein the information on the specimens consecutively dispensed by the pretreatment specimen dispensing nozzle comprises information indicating that a first specimen dispensed by the pretreatment specimen dispensing nozzle is of a different type of specimen material than a second specimen to be dispensed by the pretreatment specimen dispensing nozzle after the first specimen is dispensed, and issues a special washing command based on determining that special washing of the pretreatment specimen dispensing nozzle is necessary;

a special washing control unit that controls the first special washing liquid dispensing unit, the pretreatment table, and the pretreatment specimen dispensing nozzle based on the special washing command from the special washing determination unit for causing the first special washing liquid dispensing unit to dispense the special washing liquid to the pretreatment containers held on the pretreatment table, and for causing the pretreatment specimen dispensing nozzle to suck the special washing liquid from the pretreatment containers storing the special washing liquid; and a pretreatment container content storage unit that stores pretreatment container content information indicating whether each of the pretreatment containers stores the special washing liquid, with respect to all the pretreatment containers held on the pretreatment table, wherein after receiving the special washing command, the special washing control unit:

determines whether a first pretreatment container storing the special washing liquid is present on the pretreatment table based on the pretreatment container content information;

controls the pretreatment table so that the first pretreatment container storing the special washing liquid is positioned in a suction position of the pretreatment specimen dispensing nozzle based on determining that the first pretreatment container is present on the pretreatment table;

controls the pretreatment specimen dispensing nozzle to cause the pretreatment specimen dispensing nozzle to suck the special washing liquid from the first pretreatment container; and causes the pretreatment specimen dispensing nozzle to dispense the special washing liquid sucked from the first pretreatment container.

8. The automated analyzer according to claim 7, wherein after receiving the special washing command, the special washing control unit:

determines that the first pretreatment container storing the special washing liquid is not present on the pretreatment table based on the pretreatment container content information; and controls the first special washing liquid dispensing unit, the pretreatment table, and the pretreatment specimen dispensing nozzle to cause the first special washing liquid dispensing unit to dispense the special washing liquid to a second pretreatment container held on the pretreatment table and to cause the pretreatment specimen dispensing nozzle to suck the special washing liquid from the second pretreatment container.

9. The automated analyzer according to claim 7, further comprising:

a second special washing liquid dispensing unit that dispenses the special washing liquid to the reaction containers, wherein after receiving the special washing command, the special washing control unit:

determines that the first pretreatment container storing the special washing liquid is not present on the pretreatment table based on the pretreatment container content information; and controls the second special washing liquid dispensing unit and the pretreatment specimen dispensing nozzle to cause the second special washing liquid dispensing unit to dispense the special washing liquid to a selected reaction container of the plurality of reaction containers held on the reaction table and to cause the pretreatment specimen dispensing nozzle to suck the special washing liquid from the selected reaction container of the plurality of reaction containers.

10. The automated analyzer according to claim 9, further comprising:

a special washing liquid supply unit for the reagent dispensing nozzle that supplies the special washing liquid, the reagent dispensing nozzle being able to suck the special washing liquid from the special washing liquid supply unit for the reagent dispensing nozzle, wherein the special washing control unit:

controls the reagent dispensing nozzle, the special washing liquid supply unit for the reagent dispensing nozzle, the reaction table, and the pretreatment specimen dispensing nozzle based on the special washing command from the special washing determination unit to cause the reagent dispensing nozzle, as the second special washing liquid dispensing unit, to dispense the special washing liquid from the special washing liquid supply unit for the reagent dispensing nozzle to the reaction containers and to cause the pretreatment specimen dispensing nozzle to suck the special washing liquid from the reaction containers.

11. The automated analyzer according to claim 7, further comprising:

a special washing liquid supply unit for the specimen dispensing nozzle that supplies the special washing liquid, the specimen dispensing nozzle being able to suck the special washing liquid from the special washing liquid supply unit for the specimen dispensing nozzle, wherein the special washing control unit:

controls the specimen dispensing nozzle, the special washing liquid supply unit for the specimen dispensing nozzle, the pretreatment table, and the pretreatment specimen dispensing nozzle based on the special washing command from the special washing determination unit to cause the specimen dispensing nozzle, as the first special washing liquid dispensing unit, to dispense the special washing liquid from the special washing liquid supply unit for the specimen dispensing nozzle to a selected pretreatment container of the plurality of pretreatment containers, and to cause the pretreatment specimen dispensing nozzle to suck the special washing liquid from the selected pretreatment container of the plurality of pretreatment containers.

12. The automated analyzer according to claim 11, wherein the special washing determination unit determines that special washing of the specimen dispensing nozzle is necessary and issues a second special washing command based on determining that special washing of the specimen dispensing nozzle is necessary, and wherein the special washing control unit:

controls the specimen dispensing nozzle based on the second special washing command to cause the specimen dispensing nozzle to suck the special washing liquid from the special washing liquid supply unit for the specimen dispensing nozzle and to cause the specimen dispensing nozzle to dispense the special washing liquid to the first pretreatment container.

13. The automated analyzer according to claim 7, further comprising:

a control unit, wherein the control unit determines whether or not an analysis operation of reexamination is necessary for a specimen based on an analysis result of a first analysis, wherein at least one of the first specimen and the second specimen consecutively dispensed by the pretreatment specimen dispensing nozzle has been determined to require reexamination; and wherein, when performing the analysis operation of reexamination for the specimen for which it is determined that reexamination is necessary, based on the determination that the analysis operation of reexamination is necessary, the control unit controls the pretreatment specimen dispensing nozzle so that a pretreatment specimen is dispensed again from the pretreatment container storing the pretreatment specimen prepared during the first analysis to the reaction container.

14. An automated analyzer comprising:
a specimen table that holds a plurality of specimen containers for storing specimens;
a pretreatment table that holds a plurality of pretreatment containers for storing pretreatment specimens obtained by performing pretreatment on the specimens;
a reaction table that holds a plurality of reaction containers for causing the pretreatment specimens to react with reagents;
a reagent table that holds a plurality of reagent containers for storing the reagents;
a specimen dispensing mechanism disposed between the specimen table and the pretreatment table, the specimen dispensing mechanism comprising a specimen dispensing nozzle that delivers the specimens from the specimen containers held on the specimen table to the pretreatment containers held on the pretreatment table;
a specimen dispensing nozzle washing mechanism comprising a plurality of washing liquid supply units;
a pretreatment specimen dispensing mechanism disposed between the pretreatment table and the reaction table, the pretreatment specimen dispensing mechanism comprising a pretreatment specimen dispensing nozzle that delivers the pretreatment specimens from the pretreatment containers held on the pretreatment table to the reaction containers held on the reaction table;
a pretreatment specimen dispensing nozzle washing mechanism comprising a washing water supply unit;
a first special washing liquid dispensing unit that dispenses a special washing liquid used for special washing to the pretreatment containers;
a special washing information storage unit that stores special washing information comprising conditions required for special washing for avoiding carry-over of the pretreatment specimen dispensing nozzle and a washing method for special washing for avoiding carry-over of the pretreatment specimen dispensing nozzle;
a special washing determination unit that determines that special washing of the pretreatment specimen dispensing nozzle is necessary based on the special washing information and information on the specimens consecutively dispensed by the pretreatment specimen dispensing nozzle, wherein the information on the specimens consecutively dispensed by the pretreatment specimen dispensing nozzle comprises information indicating that a first specimen dispensed by the pretreatment specimen dispensing nozzle is of a different type of specimen material than a second specimen to be dispensed by the pretreatment specimen dispensing nozzle after the first specimen is dispensed, and issues a special washing command based on determining that special washing of the pretreatment specimen dispensing nozzle is necessary;
a special washing control unit that controls the first special washing liquid dispensing unit, the pretreatment table, and the pretreatment specimen dispensing nozzle based on the special washing command from the special washing determination unit for causing the first special washing liquid dispensing unit to dispense the special washing liquid to the pretreatment containers held on the pretreatment table, and for causing the pretreatment specimen dispensing nozzle to suck the special washing liquid from the pretreatment containers storing the special washing liquid; and
a pretreatment container content storage unit that stores pretreatment container content information indicating whether each of the pretreatment containers stores the special washing liquid, with respect to all the pretreatment containers held on the pretreatment table,
wherein after receiving the special washing command, the special washing control unit:
determines whether a first pretreatment container storing the special washing liquid is present on the pretreatment table based on the pretreatment container content information;
controls the pretreatment table so that the first pretreatment container storing the special washing liquid is positioned in a suction position of the pretreatment specimen dispensing nozzle based on determining that the first pretreatment container storing the special washing liquid is present on the pretreatment table;
controls the pretreatment specimen dispensing nozzle to cause the pretreatment specimen dispensing nozzle to suck the special washing liquid from the first pretreatment container;
moves the pretreatment specimen dispensing nozzle to a position facing a discharge opening of the pretreatment specimen dispensing nozzle washing mechanism, and causes the pretreatment specimen dispensing nozzle to dispense the special washing liquid sucked from the first pretreatment container; and
causes the pretreatment specimen dispensing nozzle to be subject to a water washing process by the pretreatment specimen dispensing nozzle washing mechanism using the washing water supply unit.

15. The automated analyzer according to claim 14, wherein after receiving the special washing command, the special washing control unit:
determines that the first pretreatment container storing the special washing liquid is not present on the pretreatment table based on the pretreatment container content information; and
controls the first special washing liquid dispensing unit, the pretreatment table, and the pretreatment specimen dispensing nozzle to cause the first special washing liquid dispensing unit to dispense the special washing liquid to a second pretreatment container held on the pretreatment table and to cause the pretreatment specimen dispensing nozzle to suck the special washing liquid from the second pretreatment container.

16. The automated analyzer according to claim 14, further comprising:
a second special washing liquid dispensing unit that dispenses the special washing liquid to the reaction containers,
wherein after receiving the special washing command, the special washing control unit:
determines that the first pretreatment container storing the special washing liquid is not present on the pretreatment table based on the pretreatment container content information; and
controls the second special washing liquid dispensing unit and the pretreatment specimen dispensing nozzle to cause the second special washing liquid dispensing unit to dispense the special washing liquid to a selected reaction container of the plurality of reaction containers held on the reaction table and to cause the pretreatment specimen dispensing nozzle to suck the special washing liquid from the selected reaction container of the plurality of reaction containers.

17. The automated analyzer according to claim 16, further comprising:
a special washing liquid supply unit for the reagent dispensing nozzle that supplies the special washing liquid, the reagent dispensing nozzle being able to suck the special washing liquid from the special washing liquid supply unit for the reagent dispensing nozzle,
wherein the special washing control unit:
controls the reagent dispensing nozzle, the special washing liquid supply unit for the reagent dispensing nozzle, the reaction table, and the pretreatment specimen dispensing nozzle based on the special washing command from the special washing determination unit to cause the reagent dispensing nozzle, as the second special washing liquid dispensing unit, to dispense the special washing liquid from the special washing liquid supply unit for the reagent dispensing nozzle to the reaction containers and to cause the pretreatment specimen dispensing nozzle to suck the special washing liquid from the reaction containers.

18. The automated analyzer according to claim 14, further comprising:
a special washing liquid supply unit for the specimen dispensing nozzle that supplies the special washing liquid, the specimen dispensing nozzle being able to suck the special washing liquid from the special washing liquid supply unit for the specimen dispensing nozzle,
wherein the special washing control unit:
controls the specimen dispensing nozzle, the special washing liquid supply unit for the specimen dispensing nozzle, the pretreatment table, and the pretreatment specimen dispensing nozzle based on the special washing command from the special washing determination unit to cause the specimen dispensing nozzle, as the first special washing liquid dispensing unit, to dispense the special washing liquid from the special washing liquid supply unit for the specimen dispensing nozzle to a selected pretreatment container of the plurality of pretreatment containers, and to cause the pretreatment specimen dispensing nozzle to suck the special washing liquid from the selected pretreatment container of the plurality of pretreatment containers.

19. The automated analyzer according to claim 18, wherein the special washing determination unit determines that special washing of the specimen dispensing nozzle is necessary and issues a second special washing command based on determining that special washing of the specimen dispensing nozzle is necessary,
wherein the special washing control unit:
controls the specimen dispensing nozzle based on the second special washing command to cause the specimen dispensing nozzle to suck the special washing liquid from the special washing liquid supply unit for the specimen dispensing nozzle and to cause the specimen dispensing nozzle to dispense the special washing liquid to the first pretreatment container.

20. The automated analyzer according to claim 14, further comprising:
a pretreatment container washing mechanism comprising a discharge nozzle that discharges a washing liquid to a selected pretreatment container of the plurality of pretreatment containers held on the pretreatment table, and a suction nozzle that sucks the washing liquid,
wherein the special washing control unit:
controls the pretreatment container washing mechanism, the pretreatment table, and the pretreatment specimen dispensing nozzle based on the special washing command from the special washing determination unit to cause the discharge nozzle of the pretreatment container washing mechanism to be used as the first special washing liquid dispensing unit, and for causing the pretreatment specimen dispensing nozzle to suck the washing liquid from the first pretreatment container storing the washing liquid from the discharge nozzle.

* * * * *